(12) United States Patent
Emile De Torbal

(10) Patent No.: US 6,491,338 B2
(45) Date of Patent: Dec. 10, 2002

(54) OPEN ROOF CONSTRUCTION FOR A VEHICLE

(75) Inventor: Rene Fernand Emile De Torbal, Eindhoven (NL)

(73) Assignee: Inalfa Industries B.V. (NL)

( * ) Notice: Subject to any disclaimer, the term of this patent is extended or adjusted under 35 U.S.C. 154(b) by 0 days.

(21) Appl. No.: 09/776,225

(22) Filed: Feb. 2, 2001

(65) Prior Publication Data

US 2001/0011835 A1 Aug. 9, 2001

(30) Foreign Application Priority Data

Feb. 4, 2000 (NL) ............................................ 1014296

(51) Int. Cl.⁷ ................................................ B60J 7/043
(52) U.S. Cl. ...................................... 296/211; 296/214
(58) Field of Search ................................ 296/211, 214; 47/63, 56; 160/101, 104, 105

(56) References Cited

U.S. PATENT DOCUMENTS 3,184,801 A * 5/1965 Fletcher ..................... 49/63 X
3,285,321 A * 11/1966 Johnson et al. .............. 160/104
5,405,184 A 4/1995 Jardin et al. ................. 296/215
5,507,547 A 4/1996 Hattass et al. .............. 296/211
6,039,390 A * 3/2000 Agrawal et al ............. 296/211
6,282,911 B1 * 9/2001 Watanabe et al. ........... 296/214

FOREIGN PATENT DOCUMENTS

| EP | 0 343 419 A | 11/1989 | |
|---|---|---|---|
| EP | 43 11 049 C | 6/1994 | |
| FR | 2 723 612 A | 2/1996 | |
| JP | 2120827 | * 5/1990 | ................. 296/211 |

* cited by examiner

Primary Examiner—Dennis H. Pedder
(74) Attorney, Agent, or Firm—Westman, Champlin & Kelly, P.A.; S. Koehler

(57) ABSTRACT

An open roof construction for a vehicle having a roof opening that can be closed by a movable closure element. A sliding sunscreen is positioned under the closure element, wherein the sunscreen at least partially is a material that exhibits variable light transmission. The light transmission can be varied automatically or manually.

31 Claims, 2 Drawing Sheets

OPEN ROOF CONSTRUCTION FOR A VEHICLE

BACKGROUND OF THE INVENTION

The invention relates to an open roof construction for a vehicle, having a roof opening which can be closed by a movable closure element, wherein the element is used for varying the light transmission through the roof opening.

In order to enhance the degree of comfort in a vehicle fitted with an open roof construction having a roof opening approaches are sought for varying the amount of incident light through the roof opening. Dutch patent application no. 9102116, from which the present invention departs, discloses an open roof construction wherein the closure element consists of a sliding panel, which is provided with a coating that exhibits variable light transmission. The variable light transmission proves to be advantageous when the panel closes the roof opening entirely or for the is greater part. However, when the panel is moved to a position in which it opens the roof opening, the coating exhibiting variable light transmission loses its function.

Another approach used in prior art open roof constructions is a sunscreen present under the closure element. In this case, light transmission through the roof opening can be varied by changing the position of the sunscreen to a greater or lesser degree so as to cover the roof opening to a greater or lesser degree. In fact, the designer opts for a principle whereby the extent of the shade provided by the sunscreen is varied. In principle, there is no regulation of light intensity.

SUMMARY OF THE INVENTION

In accordance with one aspect of the present invention, the open roof construction includes a sliding sunscreen positioned under the closure element, wherein the sunscreen at least partially has a material that exhibits variable light transmission. The roof opening can be covered by the sunscreen to a degree that can be freely selected. Consequently, it is possible in the selected position of the sunscreen to vary light transmission through a roof opening.

Within the scope of the invention the sunscreen may consist substantially entirely of a material that exhibits variable light transmission. The sunscreen may also have a central portion that exhibits variable light transmission and a frame that surrounds the central portion, wherein the frame consists of a material that does not exhibit variable light transmission.

In the latter case an advantageous embodiment may be one wherein the central portion can be detached from the surrounding frame. In this way it is possible to build a central portion into any conventional sunscreen prior to, during and after the fitting of the open roof construction in a vehicle.

The open roof construction according to the invention provides a number of advantages. The construction according to the present invention can be used with practically any conventional open roof construction. Since the movable closure element no longer has a coating or a portion that exhibits variable light transmission, as is the case with the prior art, the design restrictions with regard to the closure element are less stringent. Furthermore, possible damage to the light-transmitting material can be repaired more easily and at lower expense, since it is only necessary in the worst case to replace the sunscreen. Whereas, in the prior art, it would be necessary in the worst case to replace the entire closure element.

In spite of the fact that the sunscreen now consists, at least partially so, of a material that exhibits variable light transmission, the sunscreen can continue to perform other functions, such as acoustic and thermal insulation. This enables the sunscreen to provide the same degree of luxury as any other conventional sunscreen.

In another embodiment of the open roof construction according to the present invention, light transmission is varied automatically. This can for example be achieved when light transmission is varied on the basis of measured quantities inside the vehicle, such as light intensity or temperature, for example. For instance, if the temperature inside the vehicle rises or threatens to rise too high, the degree of light transmission can be reduced automatically, thus reducing the heating influence of the incident light.

It is also possible, of course, to vary the light transmission manually. In that case the driver or a passenger of the vehicle can select a degree of light transmission to his or her liking.

An electrochromatic material may be selected as a suitable material exhibiting variable light transmission. Components consisting of such electrochromatic material are known and can be used in accordance with widely varying specifications.

An inexpensive variant of the open roof construction according to the invention provides an embodiment wherein the material that exhibits variable light transmission consists of polarisation filters arranged in side-by-side relationship, which can be pivoted or otherwise moved with respect to each other. As is known, the amount of light penetrating through the polarisation filters can be regulated between a maximum value and a minimum value by pivoting the two filters relative to each other.

BRIEF DESCRIPTION OF THE DRAWINGS

The invention will be explained in more detail hereafter with reference to the drawings, which shows a number of embodiments of the open roof construction according to the invention.

DETAILED DESCRIPTION OF THE ILLUSTRATIVE EMBODIMENTS

Figure 1:
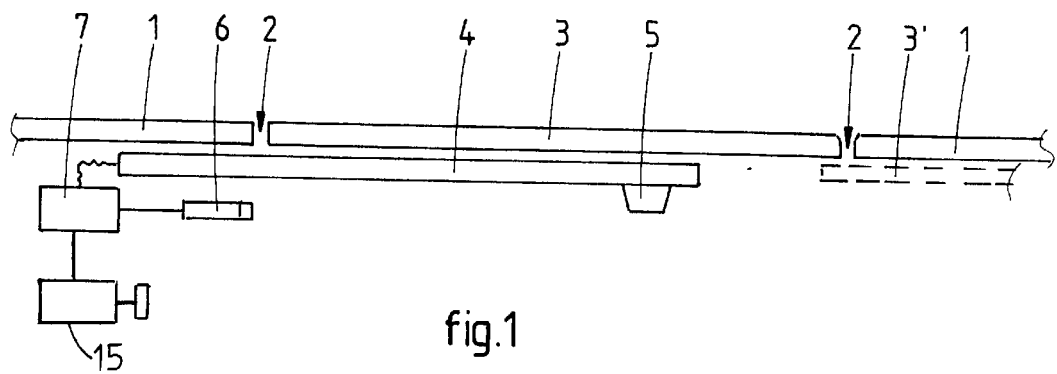
FIG. 1 is a schematic, longitudinal sectional view of a part of an embodiment of the open roof construction according to the present invention.

FIG. 1 is a schematic longitudinal sectional view of a part of an open roof construction according to the invention. The figure shows a part of the fixed roof construction 1 of the vehicle. A roof opening 2 has been formed in roof construction 1, wherein roof opening 2 can be closed by a movable closure element 3. In the embodiment is illustrated, movable elements 3 is a sliding panel. The panel 3 can be moved (substantially slid), in a known manner to a position 3', illustrated in dotted lines, where the roof opening 2 is released to a greater or lesser extent.

Present under the fixed roof construction 1 and under panel 3 is a sliding sunscreen 4. As is known, sunscreen 4 is capable of sliding movement in a direction substantially parallel to the fixed roof construction 1 and to panel 3, between a retracted position, in which sunscreen 4 releases roof opening 2 to a large extent, and an operative position, in which sunscreen 4 essentially overlaps the roof opening 2. Sunscreen 4 can also take up any position therebetween, of course, depending on the user's wishes, Sunscreen 4 can also be fitted with a handle 5 in the illustrated embodiment to provide a user with a grip on sunscreen 4.

In accordance with the invention, sunscreen 4 includes, at least partially, a material that exhibits variable light transmission. In the exemplary embodiment illustrated in FIG. 1, sunscreen 4 may for example consist of an electrochromatic material, whose light transmission can be regulated under the influence of an electric current. To this end, again in the embodiment that is shown in FIG. 1, a sensor 6 (a temperature gauge, for example) is present in the interior of the vehicle, wherein the sensor 6 controls the sunscreen 4. In particular, sensor 6 is adapted to provide a signal to control unit 7. If control unit 7 determines that the temperature measured by sensor 6 has is exceeded a predetermined value, a signal is delivered to the sunscreen 4 (in particular the electrochromatic material thereof) to decrease the light transmission thereof. As a result, the incidence of sunlight in the vehicle is reduced, making it possible to regulate the temperature inside the vehicle. Within this framework it is noted that the control units can also drive other elements for regulating the temperature, such as a ventilation system.

Another, non-limitative, example of a sensor 6 is called a photometer, which measures the intensity or extent of the light inside the vehicle. The use of sensor 6 and control unit 7 makes it possible to effect automatic variation of the light transmission of sunscreen 4. It is also possible, of course, for the light transmission to be manually varied by the driver or by a passenger of the vehicle with a user operated switch 15. When a sunscreen 4 consisting of an electrochromatic material is used, a desired value can be adjusted for the current or the voltage that is applied to the sunscreen 4 by an adjusting element, for example a potentiometer.

Figures 2, 3, 4:
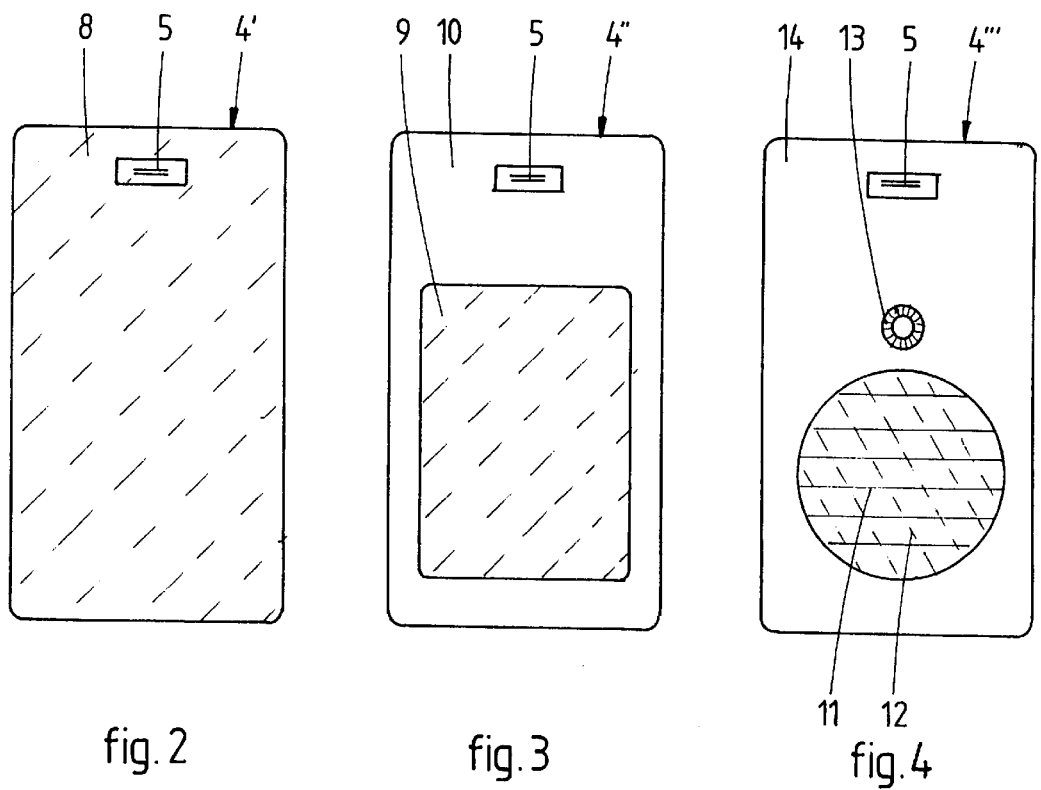
FIG. 2 is a bottom plan view of an embodiment of a sunscreen as used in the open roof construction according to the present invention.
FIG. 3 is a bottom plan view of another embodiment of a sunscreen.
FIG. 4 is a bottom plan view of yet another embodiment of a sunscreen.

FIGS. 2–4 show three possible variants of embodiments of the sunscreen. It is noted that other embodiments fall within the scope of the invention.

FIG. 2 shows an embodiment of a sunscreen 4' with a major surface extent that consists in its entirety of a material that exhibits variable light transmission. This may be an electrochromatic or a photochromatic material, for example.

In the embodiment shown in FIG. 3, sunscreen 4" has a central portion 9, which is made of a material that exhibits variable light transmission, and a frame 10 surrounding central portion 9, which is made of a material that does not exhibit variable light transmission.

In the embodiment illustrated in FIG. 4, two polarisation filters that can be pivoted with respect to each other are arranged in side-by-side relationship in the sunscreen 4'". The filters are only schematically represented by hatched lines 11 and dotted hatched lines 12. Since each polarisation filter has a specific polarisation direction, the overall light transmission through the polarisation filters 11 and 12 can be varied between a value of substantially zero and a maximum value by pivoting or otherwise moving the two filters 11 and 12 with respect to each other. In the illustrated embodiment, a manually operated rotary knob 13 is used for pivoting the polarisation filters 11 and 12 with respect to each other. Similar to that which has been noted with regard to the embodiment of FIG. 1, it is also possible to automate the pivoting or moving of the polarisation filters using an electric motor, for example, driven by control unit 7 that receives a signal from sensor 6.

Those skilled in the art will recognize that the variation of the light transmission of the light-transmitting material 8 and 9 of FIGS. 2 and 3, respectively, can take place automatically as well as manually. In addition, combinations of automatic and manual variation are possible.

Figure 5:
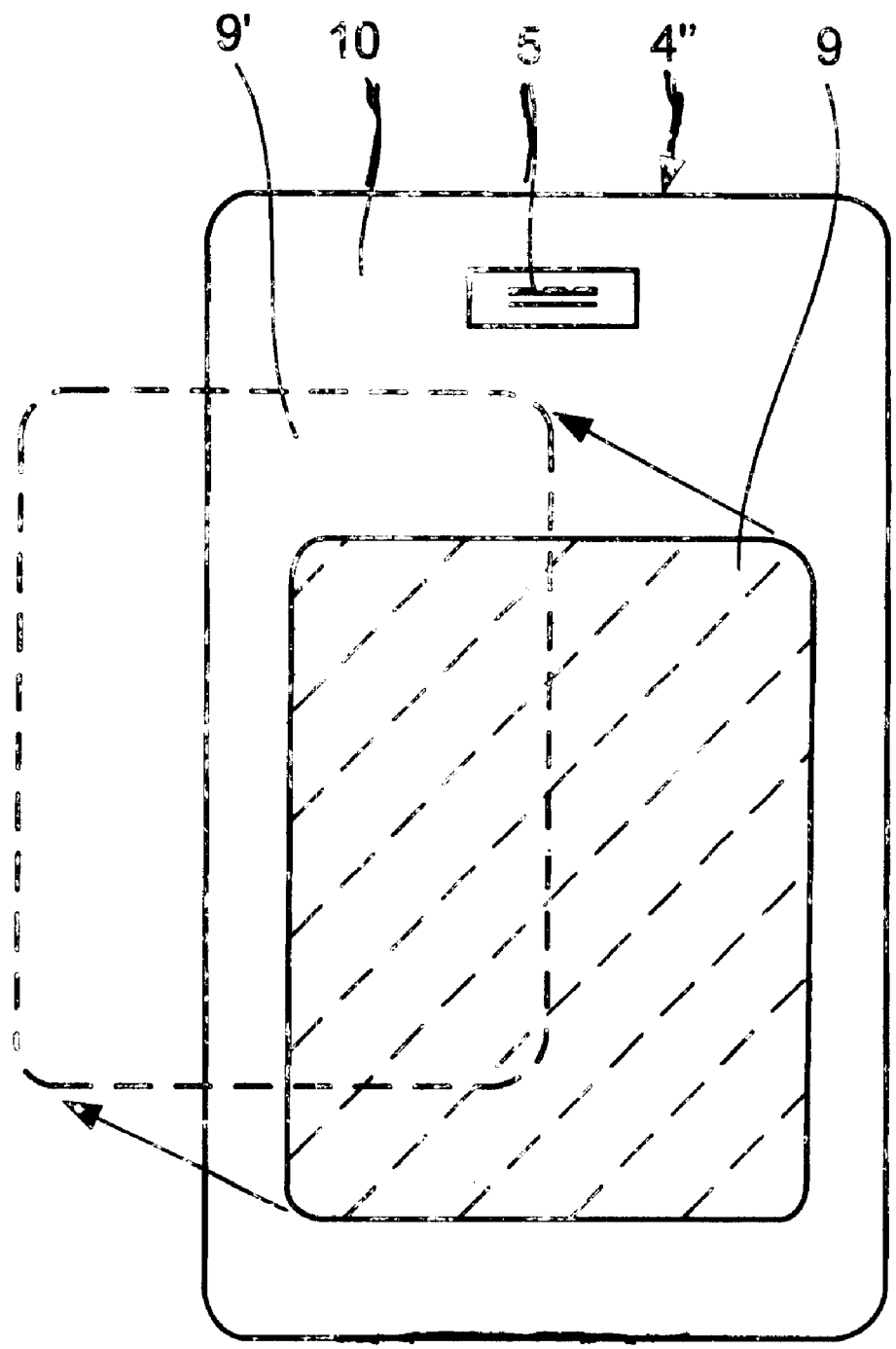
FIG. 5 is a bottom plan view illustrating a detachable portion of the sunscreen illustrated in FIG. 3.

In the embodiments illustrated in FIGS. 3 and 4, it may be possible to detach the portion consisting of light-transmitting material (material 9 and polarisation filters 11 and 12, respectively) from the surrounding frame 10 and 14, respectively, of the sunscreen. For example, FIG. 5 illustrates material 9' that has been detached from the surrounding frame 10. In this manner, the portion consisting of a material exhibiting variable light transmission can be replaced quickly and easily if the portion should be damaged.

The open roof construction according to the invention makes it possible to adapt existing open roof constructions afterwards in a quick and simple manner in accordance with the specifications of the present invention. Referring by way of example to the embodiment of FIG. 3, it is only necessary to form a central opening in a conventional sunscreen that has already been mounted, in which opening the material exhibiting variable light transmission is fitted. If said material is an electrochromatic material, the only thing that needs to be done in that case is to connect a power supply line to the sunscreen. In that case a control unit (automatic or manual) can be mounted at a suitable location in the vehicle, for example in the roof upholstery.

The invention is not restricted to the above-described embodiments, which can be varied in several ways without departing from the scope of the invention as defined in the claims.

What is claimed is:

1. An open roof construction for a vehicle comprising:
   a roof opening that can be closed by a movable closure element; and
   a sliding sunscreen positioned under the closure element, wherein the sunscreen at least partially comprises an electrochromatic material that exhibits variable light transmission.

2. The open roof construction according to claim 1, wherein a major surface extent of the sunscreen comprises substantially entirely of a material that exhibits variable light transmission.

3. The open roof construction according to claim 1, wherein the sunscreen comprises a central portion that exhibits variable light transmission and a frame that surrounds the central portion, wherein the frame comprises a material that does not exhibit variable light transmission.

4. The open roof construction according to claim 3, wherein the central portion is detachable from the surrounding portion.

5. The open roof construction according to claim 1, and further comprising a control unit adapted to automatically vary the light transmission of the material.

6. The open roof construction according to claim 5, wherein the light transmission of the material is varied by the control unit as a function of the value of measured quantities inside the vehicle.

7. The open roof construction according to claim 6, wherein the light transmission of the material is varied by the control unit as a function of light intensity.

8. The open roof construction according to claim 6, wherein the light transmission of the material is varied by the control unit as a function of temperature.

9. The open roof construction according to claim 1, and further comprising a user operated switch adapted to manually vary the light transmission of the material.

10. The open roof construction of claim 1 and further comprising a control unit coupled to the sunscreen to control light transmission of the sunscreen.

11. The open roof construction of claim 10 and further comprising a sensor coupled to the control unit, the sensor providing a signal indicative of light in the vehicle.

12. The open roof construction of claim 10 and further comprising a user operated device to provides a signal indicative of a user setting for light transmission through the sunscreen.

13. A sunscreen adapted for sliding movement in an open roof construction of a vehicle, the sunscreen at least partially comprising a material that exhibits variable light transmission by altering the chromatic characteristics of the material.

14. The sunscreen of claim 13 and further comprising a control unit coupled to the sunscreen to control light transmission of the sunscreen.

15. The sunscreen of claim 14 further comprising a sensor coupled to the control unit, the sensor providing a signal indicative of light in the vehicle.

16. The sunscreen of claim 15 and further comprising a user operated device to provide a signal indicative of a user setting for light transmission through the sunscreen.

17. The sunscreen according to claim 13, wherein a major surface of the sunscreen comprises substantially entirely of a material that exhibits variable light transmission.

18. The sunscreen according to claim 13, wherein the sunscreen comprises a central portion that exhibits variable light transmission and a frame that surrounds the central portion, wherein the frame comprises a material that does not exhibit variable light transmission.

19. The sunscreen according to claim 18, wherein the central portion is detachable from the surrounding portion.

20. An open roof construction for a vehicle, comprising:
   a roof opening that can be closed by a movable closure element;
   a sliding panel positioned under the closure element; and
   sunscreen means for varying chromatic characteristics and light transmission of the panel.

21. An open roof construction for a vehicle comprising:
   a roof opening that can be closed by a movable closure element; and
   a sliding sunscreen positioned under the closure element, wherein the sunscreen at least partially comprises a material that exhibits variable light transmission, wherein the material comprises polarization filters arranged in side-by-side relationship that can be moved with respect to each other.

22. The open roof construction according to claim 21, wherein the sunscreen comprises a central portion that exhibits variable light transmission and a frame that surrounds the central portion, wherein the frame comprises a material that does not exhibit variable light transmission.

23. The open roof construction according to claim 22, wherein the central portion is detachable from the surrounding portion.

24. The open roof construction according to claim 21, and further comprising a control unit adapted to automatically vary the light transmission of the material.

25. The open roof construction according to claim 24, wherein the light transmission of the material is varied by the control unit as a function of the value of measured quantities inside the vehicle.

26. The open roof construction according to claim 25, wherein the light transmission of the material is varied by the control unit as a function of light intensity.

27. The open roof construction according to claim 25, wherein the light transmission of the material is varied by the control unit as a function of temperature.

28. The open roof construction according to claim 21, and further comprising a user operated switch adapted to manually vary the light transmission of the material.

29. The open roof construction of claim 21, and further comprising a control unit coupled to the sunscreen to control light transmission of the sunscreen.

30. The open roof construction of claim 29, and further comprising a sensor coupled to the control unit, the sensor providing a signal indicative of light in the vehicle.

31. The open roof construction of claim 29, and further comprising a user operated device to provide a signal indicative of a user setting for light transmission through the sunscreen.

* * * * *